United States Patent Office 3,269,012
Patented August 30, 1966

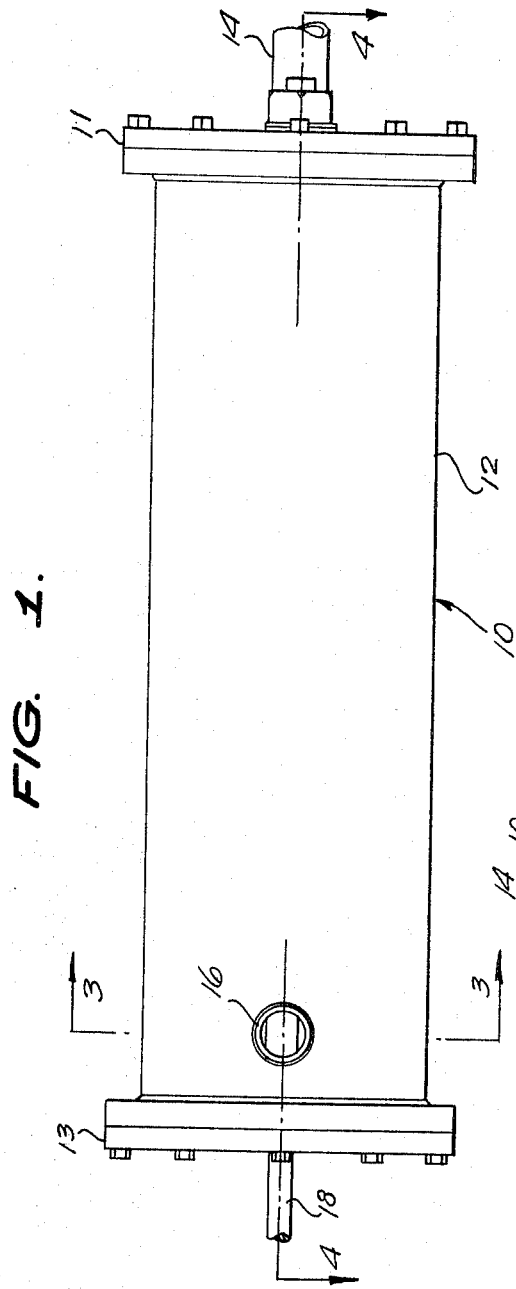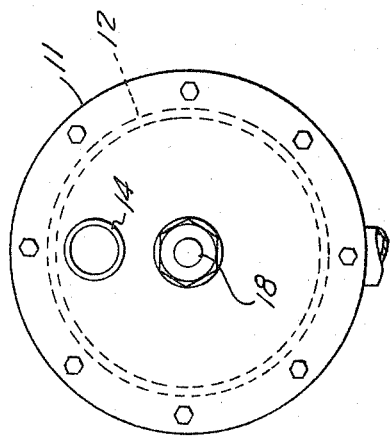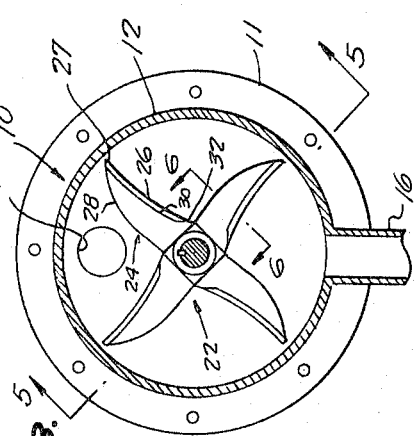

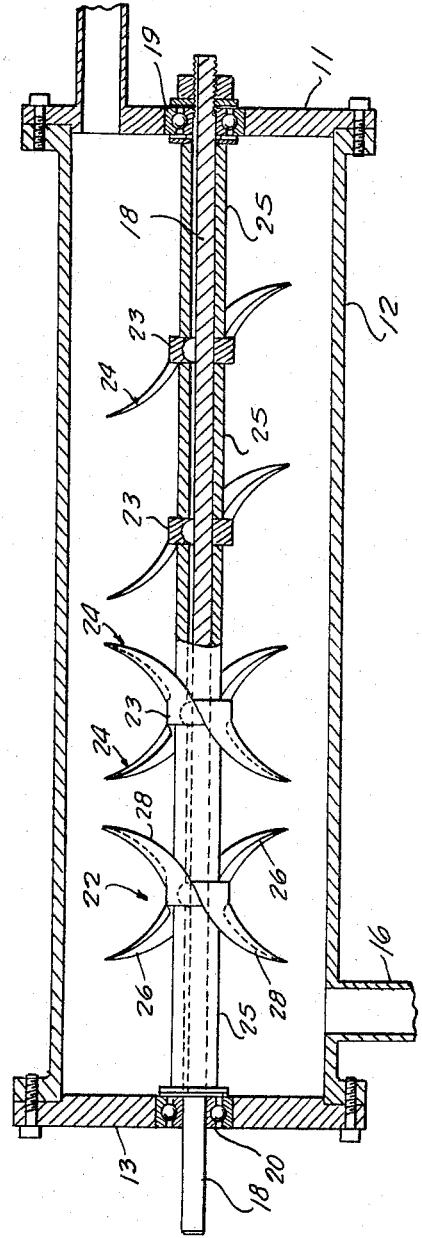

3,269,012
PLASTICIZING APPARATUS FOR PRODUCING UNIFORMLY EMULSIFIED MARGARINE
William E. Fricks, deceased, late of Rome, Ga., by Charles L. Fricks, administrator, Cedartown, Ga., assignor to Fricks' Foods, Inc., Cedartown, Ga., a corporation of Georgia
Filed Sept. 10, 1965, Ser. No. 486,567
3 Claims. (Cl. 31—35)

This invention relates to apparatus for producing uniformly emulsified margarine.

An object of the present invention is to provide an apparatus which produces a completely emulsified margarine by unique physical means.

Another object of the present invention is to provide an apparatus which subjects the margarine-producing materials to a physical working of a character such as to form a completely and uniformly emulsified end product.

A further object of the present invention is to provide an apparatus which is simple in construction, highly efficient in action, and commercially feasible.

A still further object of the present invention is to provide an apparatus which enables the plasticizing or working of fat crystals to such a degree that fats of highly divergent melting points may be converted into a stable emulsion.

Other objects and advantages of the present invention will become apparent from the following description when taken in conjunction with the accompanying drawings, in which:

FIGURE 1 is a perspective view of the emulsifying apparatus according to the present invention;

FIGURE 2 is a right-hand end view of the apparatus of FIGURE 1;

FIGURE 3 is a cross-sectional view taken on the line 3—3 of FIGURE 1;

FIGURE 4 is a longitudinal sectional view of the apparatus of FIGURE 1, with parts broken away to show the construction of the rotors and spacers;

FIGURE 5 is a fragmentary sectional view taken on the line 5—5 of FIGURE 3; and

FIGURE 6 is a fragmentary sectional view taken on the line 6—6 of FIGURE 3.

Referring to the drawings, the numeral 10 designates, in general, the apparatus for producing emulsified margarine according to the present invention, such apparatus comprising an elongated tunnel member or cylindrical tube 12 which has an inlet 14 at one end 11 for introducing margarine-producing materials into the member or tube, and also, an outlet 16 adjacent the other end 13 for discharge of the completely emulsified margarine from the member or tube. A driven shaft 18 extends along the longitudinal axis of the member or tube 12 and for the length thereof, the shaft being rotatably-supported in bearings 19 and 20 carried by the ends 11 and 13, respectively.

Disposed in tandem spaced-relation along the shaft 18 is at least one pair of rotors 22. As shown in FIGURE 4, two pairs of rotors 22 are on the driven shaft 18. Each of the rotors 22 has a hub 23, and four identical curved vanes 24 projecting from the perimeter of the hub. The hub 23 of each rotor 22 is circumposed about the driven shaft 18 and is connected to the shaft 18 for rotation therewith. As will be apparent from FIGURE 4, a spacer 25 is circumposed about the shaft 18 between adjacent hubs 23, and also about the shaft 18 between ends 11 and 13 and hubs 23 adjacent thereto, the spacer serving to retain the rotors 22 in tandem spaced-relation. Each rotor 22 has two of its vanes 24 bent to one side of its hub 23 and faces toward the inlet 14 and has two of its vanes 24 bent to the other side of its hub 23 and facing toward the outlet 16. Each vane 24 has a concave leading edge 26 and a convex trailing edge 28, the concave and convex edges terminating in a tip 27, the tips 27 being spaced from and adjacent to the inner surface of the tunnel member or cylindrical tube 12.

As will be seen from FIGURES 3 and 6, the concave edge 26 of each vane 24 is provided with a knife portion 30 which extends from its tip 27 to a terminating point 32 adjacent to and spaced from its hub 23. Each vane 24 tapers from its knife portion 30 contiguous to its terminating point 32 to its convex or concave edge 28 or 26.

Drive means is provided, not shown, which is operatively-connected to the driven shaft 18, this means being preferably of the type so as to rotate the shaft as a high rate of speed, for example, 1725 to 3650 revolutions per minute.

In operation, the margarine-producing materials are caused to be fed into the tunnel member or tube 12 through the inlet 14, whereupon the rotors 22 on the driven shaft which is rotating at a high rate of speed engage and pick up the admitted materials and force them toward the outlet 16. In the travel of the admitted materials from the inlet 14 toward and to the outlet 16 the materials are subjected to a churning action with such intensity as to form a blended product which is completely emulsified, the product being discharged from the tunnel member or tube 12 through the outlet 16, and collected in a suitable vat for subsequent treatment of such product.

By the thus described apparatus, it is possible to produce a uniformly and completely emulsified margarine, with facility, precision, and in a commercially practical manner. Also, it will be observed that by this apparatus the emulsification and physical working is effected solely by physical means. In addition, this apparatus enables the plasticizing of fat crystals to an extent such that fats of widely divergent melting points may be converted into a stable emulsion.

While this invention has been described for producing uniformly emulsified margarine, it is to be understood that it may also be employed for producing other uniformly emulsified products.

What is claimed is:

1. Apparatus for producing completely and uniformly emulsified margarine comprising an elongated tunnel member having an inlet at one end for introducing margarine-producing materials in the said member and an outlet adjacent the other end for discharging the emulsified margarine from said member, a driven shaft extending along the longitudinal axis of said member for the length thereof, at least one pair of rotors arranged in tandem spaced-relation along said shaft, each of said rotors having a hub and four identical curved vanes projecting from the perimeter of said hub, the hub of each rotor being circumposed about said shaft and connected to said shaft for rotation therewith, each rotor having two of its vanes bent to one side of its hub and facing toward said inlet and having two of its vanes bent to the other side of its hub and facing toward said outlet, each vane having a concave leading edge and a convex trailing edge with the aforesaid edges terminating in a tip, the tips of the vanes of the respective rotors being spaced from and adjacent to the inner surface of said member.

2. The apparatus according to claim 1, wherein the concave leading edge of each vane is provided with a knife portion extending from its tip to a terminating point adjacent to and spaced from its hub.

3. The apparatus according to claim 2, wherein each vane tapers from its knife portion contiguous to its terminating point to its trailing edge.

References Cited by the Examiner

UNITED STATES PATENTS

| 2,166,197 | 7/1939 | Schaub | 31—35 |
| 2,521,398 | 9/1950 | North | 31—35 |

SAMUEL KOREN, *Primary Examiner.*

HUGH R. CHAMBLEE, *Examiner.*